United States Patent Office 3,763,205
Patented Oct. 2, 1973

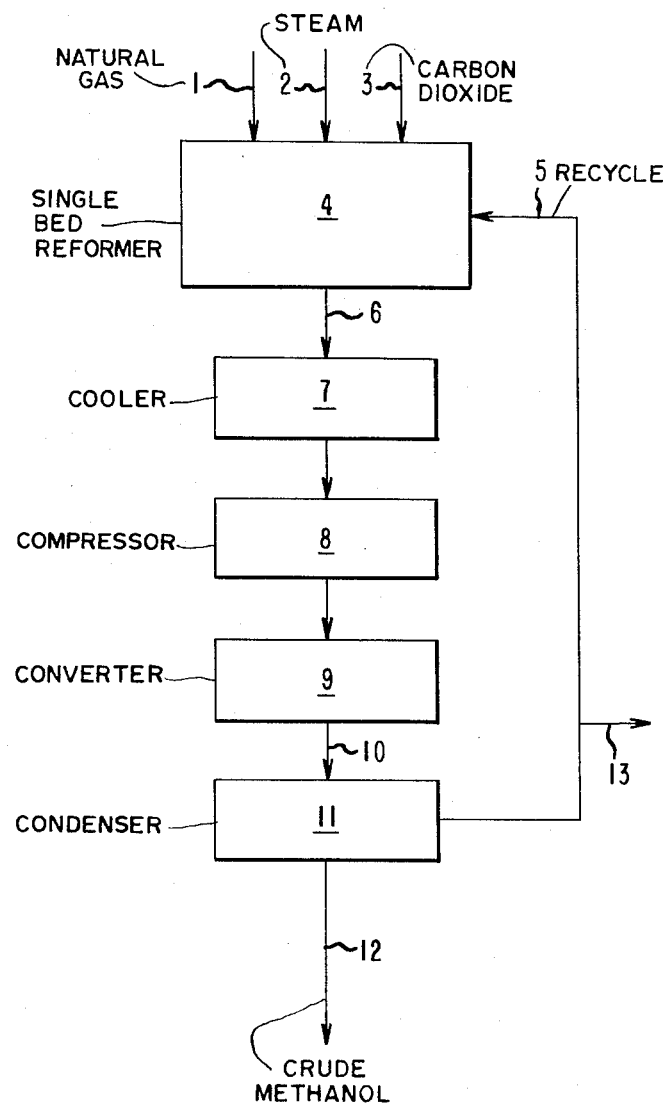

3,763,205
METHANOL PROCESS WITH RECYCLE
Ralph V. Green, Charleston, W. Va., assignor to E. I. du Pont de Nemours and Company, Wilmington, Del.
Filed May 10, 1971, Ser. No. 141,615
Int. Cl. C07c 29/16
U.S. Cl. 260—449.5  3 Claims

ABSTRACT OF THE DISCLOSURE

Methanol is made by a process that involves feeding natural gas, steam, a recycle stream and optionally carbon dioxide, to a single bed type reformer. The recycle stream is the unconverted gas from the methanol converter. The reformer output is cooled, compressed and converted to methanol in a converter operating at 450–750° F. and 500 to 1000 p.s.i.g. The converter output is cooled to separate the methanol from the recycle, i.e., the unconverted gases.

BACKGROUND OF THE INVENTION

Methanol is conventionally made from natural gas by a process involving reforming to obtain synthesis gas and then converting the synthesis gas to methanol.

In the conventional process natural gas is converted to synthesis gas containing principally CO, $CO_2$ and $H_2$ by a reforming operation in which the natural gas, steam, and optionally $CO_2$, are passed over a catalyst packed in tubes in a reformer. The conventional reformer catalyst is reduced nickel oxide; however, other catalysts could be used such as nickel-thoria-magnesia, cobalt molybdate on alumina, iron on a carrier, etc.

The reformer operates at temperatures of 1100° to 1850° F. and pressures from 0 to 600 p.s.i.g. In most operations, the use of high pressures is preferred and the reformer will operate at pressures of 150–400 p.s.i.g. and temperatures of 1650° to 1750° F.

The synthesis gas is then usually cooled to remove any water present and compressed to 2000 to 6000 p.s.i.g. The mixture of $H_2$, CO and $CO_2$ is then converted to methanol by passing over a series of catalyst beds at elevated temperatures and pressures in a methanol converter. The catalyst usually used is zinc oxide chromia, but can also be copper-zinc oxide with or without alumina and optionally promoted with ceria. The converter usually operates at pressures of 2000 to 6000 p.s.i.g. and temperatures of 550° F. to 750° F.

The methanol produced and the unconverted gases are withdrawn from the methanol converter and cooled. The unconverted gases are separated from the methanol and recycled back to the converter inlet. The crude methanol is usually further refined and stored for use.

BRIEF SUMMARY OF THE INVENTION

I have found that the conventional process for making methanol can be improved if the unconverted gases, after separation of the methanol, instead of being recycled to the converter, are recycled to the reformer. This change makes it possible to produce synthesis gas with a secondary type reformer (single bed) rather than a primary type reformer (multiple tube). In most methanol units the primary reformer is the most expensive unit; its elimination can provide significant savings in investment and operational costs. Further most, if not all, of the heat for the reforming reaction can be supplied by the sensible heat of the gases in the recycle stream.

In summary, the process of the invention involves:

(a) feeding natural gas, stream optionally carbon dioxide, and a recycle stream to a single bed type reformer to produce synthesis gas, (b) cooling and compressing the synthesis gas, (c) then feeding the compressed gas to a methanol converter which converts the synthesis gas to methanol at temperatures of 450–750° F. and pressures of 500 to 1000 p.s.i.g., (d) cooling the converter output to condense and recover the crude methanol, and (e) recycling the uncondensed gas in the converter output, i.e., the unconverted gases, to the reformer.

The crude methanol can be refined in a separate operation to provide a product of commercial quality.

DESCRIPTION OF THE DRAWING

The figure is a flow sheet of the process of the invention.

DESCRIPTION OF THE INVENTION

The process of the invention will now be described with respect to the figure.

Natural gas 1, steam 2, and optionally but preferably carbon dioxide 3 are fed to a single bed type reformer 4. A recycle stream 5 is also fed to the reformer. As will be explained subsequently, this recycle stream is the noncondensed portion of the output of the methanol converter. This stream contains hydrogen, carbon oxides, e.g., CO and $CO_2$, methane, nitrogen, water and some methanol.

The steam, methane, recycle stream and the $CO_2$, if used, are preheated by suitable means (not illustrated) to temperatures in the range of 80–1100° F. prior to being fed to the reformer. It is often desirable to subject the natural gas to conventional treatment, i.e., adsorption on carbon, to remove any sulfur present; the sulfur can be harmful to the catalysts used in the process.

The ratio of recycle feed to natural gas feed, calculated as $CH_4$, will range from 15:1–35:1, preferably around 20:1 to 24:1. The ratio of steam feed to natural gas feed, again calculated as $CH_4$, will range from 5:1 to 15:1, preferably around 11:1 to 12:1. If $CO_2$ is fed to the reformer, the ratio of stream to natural gas, calculated as $CH_4$, will range from .05:1 to 1:1, preferably about 0.10:1 to 0.15:1.

The reformer 4 operates at inlet temperatures from 1200° to 1850° F. and pressures from 150 to 700 p.s.i.g. The catalyst in the reformer can be any of the conventional catalysts used for this reforming process and preferably will be a reduced nickel oxide catalyst.

The reformer output 6 is called synthesis gas and consists essentially of hydrogen, carbon monoxide, carbon dioxide, unconverted methane, nitrogen and water. The output can be fed into waste heat boilers, not illustrated, to recover heat values, i.e., these boilers could be used to generate the necessary steam for the reformer feed.

The reformer output is cooled in a cooler to condense out the water present in the synthesis gas. The cooled gas is then compressed in a suitable compressor 8. This compressor must supply the pressure differential between the reforming and the conversion steps. Since the reforming is conducted at pressures of 150–700 p.s.i.g. and the conversion at pressures of 500–1000 p.s.i.g., the compressor must increase the pressure of the synthesis gas somewhere in the range of 50 to 700 p.s.i.g.

The compressed synthesis gas is fed to a methanol converter 9 wherein it is converted to methanol over a conventional catalyst. The converter operates at temperatures of 450°–750° F. and pressures of 500 to 1000 p.s.i.g.

The catalyst used is preferably zinc-copper but other known methanol synthesis catalysts can be used, e.g., zinc-chromia catalysts.

The output of the converter 10 is methanol, water, nitrogen, methane, carbon oxides and hydrogen. This output is then fed into a condenser 11 to condense and separate crude methanol 12 from the unconverted gases. The crude methanol can be refined (not illustrated) by any conventional process to produce a product of commercial quality.

The unconverted gases are then recycled 5 back into the reformer 4. It will usually be desired to provide a purge 13, particularly if the amount of nitrogen in the natural gas feed is high. Such a purge helps prevent the build-up of large amounts of inerts in the process.

The process of the invention will now be illustrated by an exemplary embodiment.

185 mols/hour of carbon dioxide, 1770 mols/hour of desulfurized natural gas, calculated as methane, 20,500 mols/hour of steam and 39,135 mols per hour of a recycle stream are preheated to 1650° F. in a preheater. The composition of the recycle stream is as follows:

| Compound: | Mols/hour |
|---|---|
| Hydrogen | 30,701 |
| CO | 2,208 |
| $CO_2$ | 894 |
| $CH_4$ | 4,622 |
| Nitrogen | 547 |
| Water | 65 |
| Methanol | 97 |
| Total | 39,134 |

The mixture of gases is fed into a reformer having a single bed of nickel oxide catalyst. This mixture has the following composition:

| Compound: | Mols/hour |
|---|---|
| Hydrogen | 30,701 |
| CO | 2,208 |
| $CO_2$ | 1,079 |
| $CH_4$ | 6,379 |
| Nitrogen | 562 |
| $H_2O$ | 20,565 |
| $CH_3OH$ | 97 |
| | 61,591 |

The inlet temperature of the reformer is 1650° F. and the outlet temperature is 1400° F. The reformer operates at 185 p.s.i.g.

The syntheisis gas produced in the reformer has the following composition:

| Compound: | Mols/hour |
|---|---|
| Hydrogen | 36,554 |
| CO | 3,182 |
| $CO_2$ | 1,836 |
| $CH_4$ | 4,745 |
| Nitrogen | 562 |
| $H_2O$ | 18,175 |
| | 65,054 |

The synthesis gas is then fed into a waste heat boiler and then cooled to condense and separate out the water. After this step the water content of the synthesis gas is reduced to about 333 mols/hour. The synthesis gas is then compressed to the converter pressure, 750 p.s.i.g. and fed into the converter. The converter contains a zinc-copper catalyst and operates at a temperature of 525° F.

The output of the converter is:

| Compound: | Mols/hour |
|---|---|
| Hydrogen | 31,969 |
| CO | 2,267 |
| $CO_2$ | 918 |
| $CH_4$ | 4,745 |
| Nitrogen | 562 |
| $H_2O$ | 918 |
| $CH_3OH$ | 1,833 |
| | 43,212 |

This output is condensed to separate a crude methanol of the following content:

| | Mols/hour |
|---|---|
| $CH_3OH$ | 1,733 |
| $H_2O$ | 852 |

A purge of 1,493 mols/hour is taken from the remaining gases and the remainder comprises the recycle stream to the reformer.

I claim:
1. A process for making methanol comprising:
   (a) feeding natural gas, steam and a recycle stream from step (e) to a single bed type catalytic reformer operating at 150 to 750 p.s.i.g. and 1200° to 1850° F. to produce synthesis gas, the ratio of recycle to natural gas, calculated as $CH_4$ ranging from 15:1 to 35:1 and the ratio of steam to natural gas, calculated as $CH_4$ ranging from 5:1 to 15:1,
   (b) cooling and compressing said synthesis gas to 500 to 1000 p.s.i.g.,
   (c) feeding said compressed synthesis gas to a methanol converter to make methanol at temperatures from 450° to 750° F. and pressures of 500 to 1000 p.s.i.g.,
   (d) cooling the converter output to condense and recover the methanol, and
   (e) recycling the uncondensed gas in the converter output to the reformer.
2. The process of claim 1 wherein the feed to the single bed type reformer also contains carbon dioxide.
3. The process of claim 1 wherein the ratio of recycle to natural gas, calculated as $CH_4$ ranges from 20:1 to 24:1 and the ratio of steam to natural gas, calculated as $CH_4$ ranges from 11:1 to 12:1.

References Cited
UNITED STATES PATENTS

| 3,531,266 | 9/1970 | Chernoff | 260—449 J |
| 3,475,160 | 10/1969 | Heinzelmann et al. | 252—373 |
| 2,683,152 | 7/1954 | Dickinson | 252—373 |
| 3,459,520 | 8/1969 | Percival | 48—214 |
| 3,469,957 | 9/1969 | Percival et al. | 48—197 R |
| 3,019,096 | 1/1962 | Milbourne | 48—214 X |
| 2,284,603 | 5/1942 | Belchetz et al. | 252—373 |
| 3,598,527 | 8/1971 | Quartulli et al. | 260—449 J |
| 2,964,551 | 12/1960 | Woolcock | 260—449 J |
| 2,904,575 | 9/1959 | Peet | 260—449 J |
| 2,894,826 | 7/1959 | Stengel | 260—449 J |

HOWARD T. MARS, Primary Examiner

U.S. Cl. X.R.

252—373